United States Patent Office.

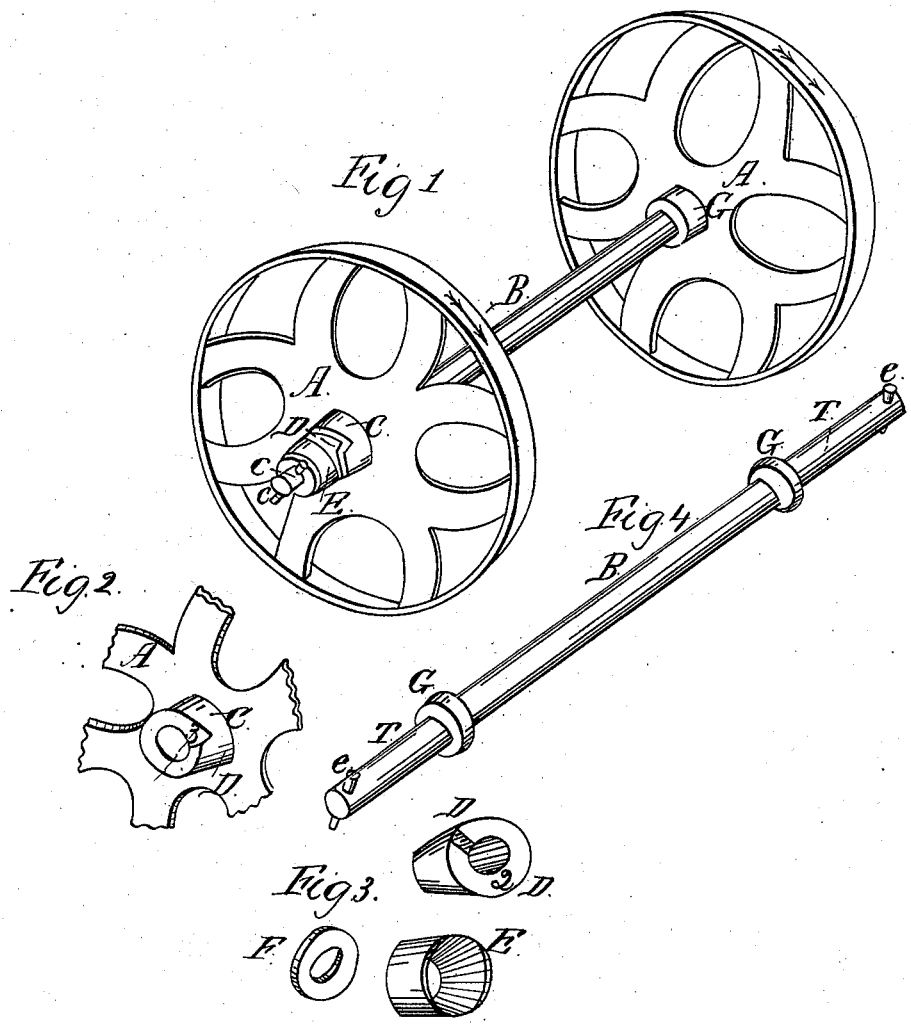

ELIAS T. FORD, OF STILLWATER, NEW YORK.

Letters Patent No. 81,617, dated September 1, 1868.

IMPROVEMENT IN FRICTION-CLUTCH.

*The Schedule referred to in these Letters Patent and making part of the same.*

TO ALL WHOM IT MAY CONCERN:

Be it known that I, ELIAS T. FORD, of the town of Stillwater, in the county of Saratoga, and State of New York, have invented new and useful Improvements in the Art of Making a Friction-Clutch, used with the drive-wheels and axles of harvesters and other agricultural machines; also, to sewing-machines, and other mechanical movements; and I do hereby declare that the following is a full and exact description thereof, reference being had to the accompanying drawings, and to the letters of reference marked thereon.

The nature of my invention consists in constructing a friction-clutch, formed with the hub of each drive-wheel, and so constructed and arranged upon each extremity of the main axle as to adhere thereto, and turn with the drive-wheels in the advance motion, but relieving the axle, and turning upon the same, as journals in the backward motion used in the construction of harvesters and other agricultural implements.

To enable others skilled in the art to make and use my invention, I will proceed to describe its construction and operation.

Figure 1 is a side view of the main axle, B, with drive-wheels, A, and clutches located.

Figure 4 presents the main axle B, with the stationary collars G G.

Figure 2 represents the hub-cam C of one drive-wheel, A.

Figure 3 illustrates detached sections of other parts of the friction-clutch.

Construction of fig. 1: The two collars or rings G G are made fast to the main axle B, as before stated. I now locate the left drive-wheel A, as seen in fig. 2, with a part of the cam 3 D, formed with the hub, upon the left extremity of the main axle, adjacent to the collar or ring G. Next thereto I locate the cone D, seen in fig. 3. Next in order, the sleeve E is inserted upon the axle B; also, upon the cone D. The angles of those two sections, D and E, are made to correspond to each other, turned and ground. The interior surface of the section E is formed conical, so as to fit the exterior surface of section D. Now, the collar or ring F is placed upon the axle-bearing r, against the end of the section E, and all are retained upon the axle B by the nut or pin c, and the construction and arrangement of the friction-clutch upon the opposite extremity of the axle-bearing r are the same.

Operation.

As the drive-wheels A A are caused to move forward, or in the direction indicated by the arrows, and by the certain angle of the cam 3 D of hub C, and the conical shape of parts D and E causing a pressure and friction, allowing, at the same time, a slight parting of the cams 3 D, 2 D, also, a pressure upon the ring and nut or pin c, and the fixed collar G, seen in fig. 4, thereby arresting the axle B, and compelling it to turn or move with one or both drive-wheels A A, and as the drive-wheels A A are turned backwards the axle is relieved for the action of the friction, which is lost. Then the angles of the cams 3 D 2 D come together again and relieve the friction and adhesion to the main axle. Now, the extremities of the axle B are simply bearings or journals, r r, upon which the drive-wheels turn backward, reverse to the direction of the arrows.

What I claim, and desire to secure by Letters Patent, is—

The friction-clutch, constructed and arranged with the drive-wheels A A, and being composed of the cone D, with its corresponding hollow sleeve, E, the cam 2 D on its end, and the corresponding cam 3 D on the drive-hub C, arresting and relieving the motion or movement of the main axle B in its forward and backward motions, in the manner and for the purpose described.

ELIAS T. FORD.

Witnesses:
S. G. EDDY,
J. B. BUFFINTON.